(12) United States Patent
Cline

(10) Patent No.: US 10,767,908 B2
(45) Date of Patent: *Sep. 8, 2020

(54) CASCADING HEAT RECOVERY USING A COOLING UNIT AS A SOURCE

(71) Applicant: TRANE INTERNATIONAL INC., Davidson, NC (US)

(72) Inventor: Lee R. Cline, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,174

(22) Filed: Jun. 11, 2018

(65) Prior Publication Data

US 2018/0356130 A1    Dec. 13, 2018

Related U.S. Application Data

(63) Continuation of application No. 14/216,419, filed on Mar. 17, 2014, now Pat. No. 9,995,509.

(60) Provisional application No. 61/801,892, filed on Mar. 15, 2013.

(51) Int. Cl.
| | |
|---|---|
| F25B 7/00 | (2006.01) |
| F25B 6/02 | (2006.01) |
| F25B 25/00 | (2006.01) |
| F24D 3/18 | (2006.01) |
| F24D 17/02 | (2006.01) |

(52) U.S. Cl.
CPC ............... *F25B 7/00* (2013.01); *F24D 3/18* (2013.01); *F24D 17/02* (2013.01); *F24D 2200/12* (2013.01); *F24F 2221/54* (2013.01); *F25B 6/02* (2013.01); *F25B 25/005* (2013.01); *F25B 2339/047* (2013.01); *Y02B 30/12* (2013.01)

(58) Field of Classification Search
CPC .................. F25B 6/02; F25B 2313/025; F25B 2313/0253; F25B 2313/02531; F25B 29/003; F25B 25/005; F25B 2339/047; F24D 3/18
See application file for complete search history.

(56) References Cited

U.S. PATENT DOCUMENTS

| | | | | |
|---|---|---|---|---|
| 3,276,516 A | * | 10/1966 | Japhet | F24F 5/0003 165/221 |
| 3,321,929 A | * | 5/1967 | Little | F24F 5/00 62/181 |

(Continued)

*Primary Examiner* — Nelson J Nieves
(74) *Attorney, Agent, or Firm* — Hamre, Schumann, Mueller & Larson, P.C.

(57) ABSTRACT

A cascade heat recovery system connects an evaporator from a heating unit to a recovery condenser of the cooling unit, where the recovery condenser is different from a cooling condenser of the cooling unit, and/or connects the evaporator of the heating unit to the cooling loop of the cooling unit, for example in fluid communication with the evaporator of the cooling unit. Both configurations allow the heating unit to be isolated or decoupled from the heat rejection circuit on which the cooling condenser runs. The use of either or both configurations, depending on the operating conditions, can use heat rejected by the evaporator of the cooling unit to be available to the heating unit, so as to provide lift to the heating unit and improve its operating efficiency.

11 Claims, 2 Drawing Sheets

(56) References Cited

U.S. PATENT DOCUMENTS

| | | | | |
|---|---|---|---|---|
| 3,322,188 A * | 5/1967 | Ostrander | F24F 5/00 | 165/64 |
| 3,520,146 A * | 7/1970 | Arnold, Sr. | F24F 5/001 | 62/115 |
| 3,782,132 A * | 1/1974 | Lohoff | F24F 5/0003 | 62/260 |
| 4,165,037 A * | 8/1979 | McCarson | F24F 3/001 | 237/1 R |
| 4,856,578 A * | 8/1989 | McCahill | F24H 4/04 | 165/241 |
| 5,727,396 A * | 3/1998 | Boyd | F24D 3/18 | 62/323.1 |
| 6,085,532 A * | 7/2000 | Sibik | F25B 49/02 | 62/177 |
| 6,502,412 B1 * | 1/2003 | Dube | F25B 6/02 | 62/175 |
| 6,523,357 B1 * | 2/2003 | Katayama | F25B 15/06 | 62/141 |
| 6,668,572 B1 * | 12/2003 | Seo | F24D 17/02 | 237/2 B |
| 6,909,349 B1 * | 6/2005 | Longardner | F25B 15/00 | 336/60 |
| 7,347,057 B1 * | 3/2008 | Garrabrant | F25B 49/043 | 62/148 |
| 2003/0221436 A1 * | 12/2003 | Xu | F25B 13/00 | 62/260 |
| 2004/0069448 A1 * | 4/2004 | Suenaga | F24D 3/02 | 165/47 |
| 2005/0155753 A1 * | 7/2005 | Goransson | F24D 11/0214 | 165/240 |
| 2005/0262869 A1 * | 12/2005 | Tongu | F25B 15/06 | 62/434 |
| 2006/0168979 A1 * | 8/2006 | Kattner | F25B 25/005 | 62/260 |
| 2010/0287956 A1 * | 11/2010 | Bowdish | F25D 3/10 | 62/50.7 |
| 2011/0030405 A1 * | 2/2011 | Ueda | F25B 29/003 | 62/238.7 |
| 2011/0146317 A1 * | 6/2011 | Cline | F25B 7/00 | 62/238.7 |
| 2011/0167847 A1 * | 7/2011 | Bittner | F25B 7/00 | 62/149 |
| 2011/0197618 A1 * | 8/2011 | Kohler | F25B 6/04 | 62/314 |
| 2011/0289952 A1 * | 12/2011 | Kim | F24D 11/0214 | 62/189 |
| 2012/0000237 A1 * | 1/2012 | Yamada | F25B 1/10 | 62/324.6 |
| 2012/0102991 A1 * | 5/2012 | Lee | F25B 7/00 | 62/160 |
| 2012/0151946 A1 * | 6/2012 | Decaestecker | F25B 29/003 | 62/79 |
| 2012/0174609 A1 * | 7/2012 | Matsuo | F25B 1/10 | 62/190 |
| 2012/0180508 A1 * | 7/2012 | Endoh | F24D 11/0221 | 62/159 |
| 2012/0198878 A1 * | 8/2012 | Pellegrini | F25B 7/00 | 62/238.6 |
| 2012/0204596 A1 * | 8/2012 | Takenaka | F25B 6/04 | 62/510 |
| 2012/0216551 A1 * | 8/2012 | Minor | C09K 5/045 | 62/79 |
| 2012/0216562 A1 * | 8/2012 | Kadle | B60H 1/00899 | 62/434 |
| 2012/0247148 A1 * | 10/2012 | Dube | F25B 9/008 | 62/509 |
| 2012/0312045 A1 * | 12/2012 | Kim | F24D 17/02 | 62/238.6 |
| 2012/0315562 A1 * | 12/2012 | Park | H01M 8/0656 | 429/435 |
| 2013/0014530 A1 * | 1/2013 | Bracewell | F24D 3/18 | 62/238.1 |
| 2013/0055745 A1 * | 3/2013 | Fukuoka | F25C 3/02 | 62/235 |
| 2013/0312444 A1 * | 11/2013 | Platt | F25B 39/04 | 62/238.1 |

\* cited by examiner

CASCADING HEAT RECOVERY USING A COOLING UNIT AS A SOURCE

FIELD

Embodiments disclosed herein relate generally to recovery of rejected heat from a refrigeration circuit used to operate in a cooling cycle, where a heat exchanger from the refrigeration circuit is the source of rejected heat. In particular, methods, systems and apparatuses are disclosed that employ for instance a connection from a heating unit to any one of a heat recovery condenser or an auxiliary condenser or an evaporator, depending on system conditions to recover the rejected heat.

BACKGROUND

A refrigeration or heating, ventilation, and air conditioning system (HVAC) system would typically include a compressor, a condenser, an expansion device, and an evaporator that form a refrigerant circuit. Such a circuit can be embodied in what is known as a chiller.

Chillers for example can be used to cool a process fluid, such as water, where such process fluid can be directly used or may be used for various other cooling purposes, such as for example cooling a space. In a cooling cycle, refrigerant vapor is generally compressed by the compressor, and then condensed to liquid refrigerant in the condenser. The liquid refrigerant can then be directed through the expansion device to reduce a temperature and can become, at least in part, a liquid/vapor refrigerant mixture (two-phase refrigerant mixture). The refrigerant, e.g. including two-phase mixture, is directed into the evaporator to exchange heat with a fluid moving through the evaporator. The refrigerant mixture can be vaporized to refrigerant vapor in the evaporator, and the refrigerant vapor can then be returned to the compressor to repeat the refrigerant cycle.

SUMMARY

In some refrigeration circuits, such as chillers, a heat recovery cycle is available and designed to salvage the heat that may normally be rejected for example to the atmosphere through what is known as a cooling tower, and can put such recovered heat to beneficial use. For example, a high rise building may require simultaneous heating and cooling during certain months of the year, such as for example the winter months. With the addition of a heat recovery cycle, heat removed from the building cooling load can be transferred to areas, e.g. of the building, that may require heat.

To provide a heat recovery cycle, a heat recovery condenser or auxiliary condenser may be added to the unit, e.g. chiller. Though the heat recovery condenser may be structurally similar to the "main" condenser of the refrigerant cycle e.g. that may be used in support of the cooling load, the heat recovery condenser can often be piped into the heating water circuit rather than to the cooling tower. During a heat recovery cycle, the unit can operate just as it does in the "cooling only" mode except that the cooling load heat is rejected to the heating water circuit rather than to the cooling tower water circuit. When hot water is required, the heating water circuit pumps can energize, and water circulated through the heat recovery (or auxiliary) condenser tube bundle by the pumps can absorb the cooling load from the compressed refrigerant gas discharged by the compressor. The heated water can then be used to satisfy desired and/or required heating. Somewhat different from the heat recovery condenser, which has often been known for use in comfort heating applications, is the auxiliary condenser which can serve a preheat function. The auxiliary condenser can be used in such applications where hot water is used for example in kitchens, lavatories, or other utility. While the operation of the auxiliary condenser can also be structurally the same as the heat recovery condenser, in some cases it can be somewhat smaller in size/scale, and its heating capacity may not be controlled.

As such it can be desirable in some cases to use the waste heat from a cooling process to meet the heating load except that there can be challenges to this. First, standard cooling equipment often reject low grade heat which may not provide adequate heating. However, selecting cooling equipment that would provide an adequate temperature to provide heating can negatively impact the cooling efficiency of the cooling equipment. For example, when the cooling unit may be used for cold thermal storage production there can be issues with obtaining a high enough condenser water temperature to enable the heat recovery. Second, in some cases the cooling equipment may not be properly sized to match the heating load, so using such equipment for heat recovery can impact both the cooling and heating system efficiencies. However, oversizing the cooling equipment to meet higher heating loads can add cost to the system and also affect the system efficiency and reliability. Also, selecting or splitting the cooling equipment into multiple smaller units to meet the heating load can also add cost to the system. Third, the control of a single unit to meet both heating and cooling loads optimally may cause improper control which can compromise cooling and/or heating production or unit reliability. Fourth, the use of a dedicated properly sized heat recovery unit, while it may be effective, can add cost and can involve control complexity. For example, the efficiency of a dedicated heat recovery unit is limited by the fact that it may need to produce high refrigerant side lift to elevate the chilled water temperatures, e.g. about 40 F to about 56 F, to heating water temperatures, e.g. about 100 F to 140 F.

In the past cascade heat recovery has been done by connecting the evaporator of the heat recovery unit to the cooling unit or equipment, for example a chiller. The evaporator of the heat recovery unit would be connected to the condenser water/cooling tower circuit. However, such a configuration can subject the evaporator to dirty cooling water tower water, which can involve periodic cleaning, which involves maintenance cost. In addition, the heat recovery pump, net positive suction head, may be limited by open system pressure in the condenser water circuit potentially causing issues with pumping designs. Another approach has been to use an intermediate heat exchanger between the condenser/cooling tower water circuit to prevent fouling of the heat recovery unit evaporator. However, such a configuration can increase the complexity of the system, requiring the addition of a pump set, can introduce heat transfer loss reducing system efficiency, and can require added cost due to the additional pump set and due to periodic cleaning.

The systems, methods, apparatuses herein are directed to recovering heat from a cooling unit, where the cooling unit is, for example a water chiller equipped with dual condensers, one of which is the cooling condenser, the other being one of heat recovery condenser (e.g. full heat recovery) or an auxiliary condenser (e.g. partial heat recovery). In some embodiments, the cooling unit is a centrifugal water chiller. It is to be appreciated that the cooling unit from which there is heat recovery, can be other chiller types that run on different compressors, may be other cooling unit types that may be equipped with dual condensers.

In one embodiment, a cascade heat recovery system connects an evaporator from a heating unit to a recovery condenser of the cooling unit, where the recovery condenser is different from a cooling condenser of the cooling unit. The evaporator is connected to the recovery condenser such that the circuit of the heating unit is isolated or decoupled from the heat rejection circuit on which the cooling condenser runs. The use of the recovery condenser can use heat rejected by the evaporator of the cooling unit to be available to the heating unit so as to provide lift to the heating unit and improve its operating efficiency.

In another embodiment, a cascade heat recovery system can include connecting the evaporator of the heating unit to the cooling loop of the cooling unit, for example in fluid communication with the cooling unit evaporator, such as for example upstream of the evaporator water inlet and in some examples downstream from water pump of the cooling loop.

DRAWINGS

These and other features, aspects, and advantages of the heat recovery systems and methods will become better understood when the following detailed description is read with reference to the accompanying drawings, wherein.

While the above-identified figures set forth particular embodiments of the heat recovery systems and methods, other embodiments are also contemplated, as noted in the discussion. In all cases, this disclosure presents illustrated embodiments of the heat recovery systems and methods by way of representation but not limitation. Numerous other modifications and embodiments can be devised by those skilled in the art which fall within the scope and spirit of the principles of the heat recovery systems and methods described herein.

DETAILED DESCRIPTION

Figure 1:
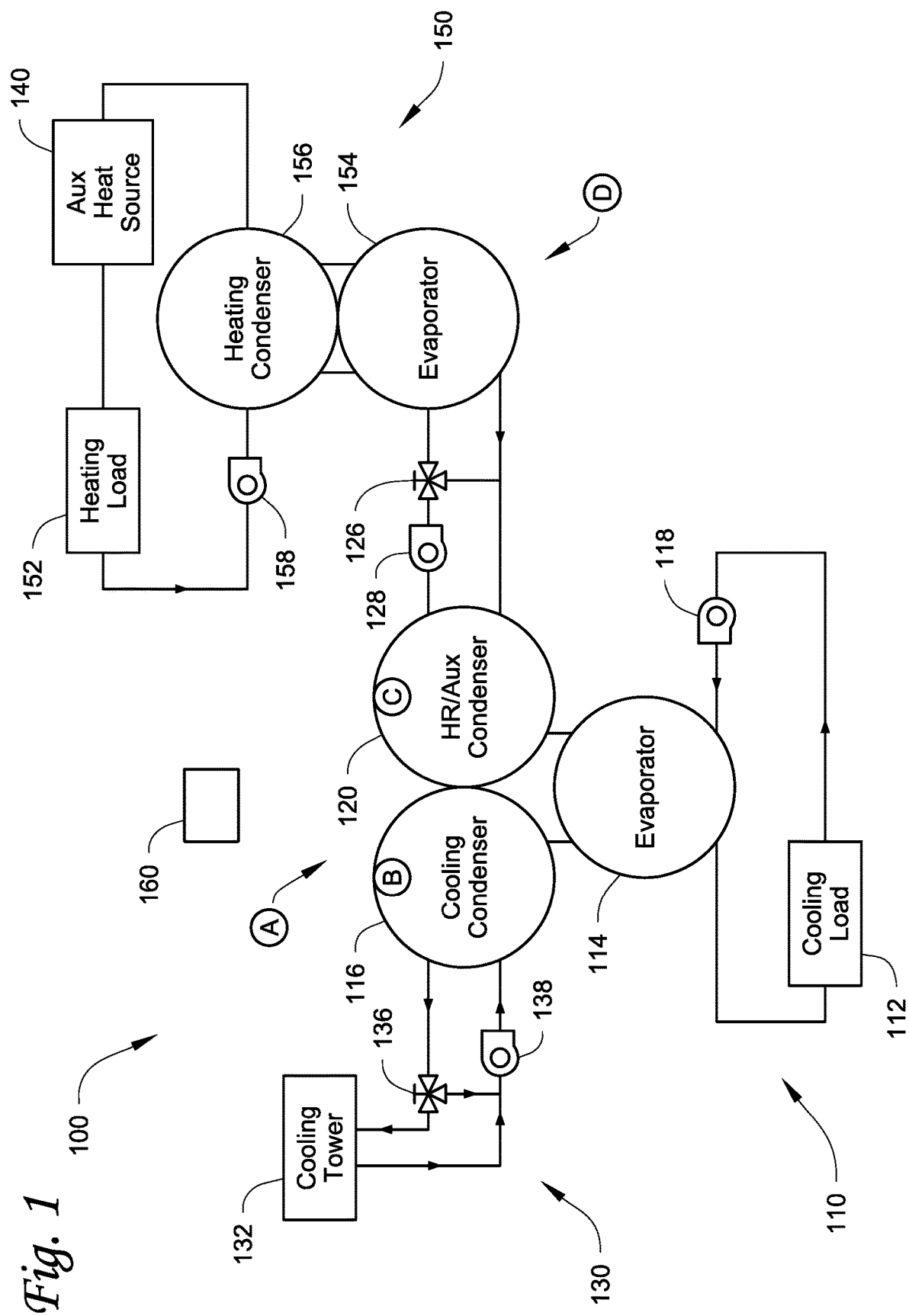
FIG. 1 is a diagrammatic plan view of one system that uses a cooling unit equipped with dual condensers, according to one embodiment.

FIG. 1 is a diagrammatic plan view of one system 100 that uses a cooling unit 110 equipped with dual condensers, one condenser 116 is sized for normal heat rejection (B) in the cooling cycle and the other condenser 120 is sized as a heat source (C) for a dedicated heating unit 150 (D), which may be a heat pump.

In the embodiment shown, the system 100 can have the appropriate piping to the components which may be included in the system such as those depicted in FIG. 1.

The cooling unit 110 has a cooling loop on which an evaporator 114 can undergo a heat exchange to vaporize refrigerant while cooling a process fluid, such as water. The cooled process fluid leaves the evaporator 114 to be used to cool a cooling load 112 and then returns to the evaporator, such as through a water pump 118 to repeat the cooling loop.

The cooling loop includes a heat rejection circuit 130, on which the condenser 116 is in fluid communication with the evaporator 114 and undergoes a heat exchange with the evaporator 114 by condensing the refrigerant vaporized by the evaporator 114. The condenser 116 can be in fluid communication with a cooling tower 132 which can use water to be pumped by, e.g. condenser water pump 138, into the condenser 116 to condense the refrigerant vapor from the evaporator 114. The leaving water from the condenser 116 can return to the cooling tower via, e.g. a three way valve 126. The condensed refrigerant can return to the evaporator 114 from the condenser 116, which can then deliver the vaporized refrigerant to a compressor (not shown) which can then deliver the high pressure, high temperature refrigerant back to the condenser 116 to repeat the cooling loop cycle. It will be appreciated that any suitable compressor and/or expansion device(s) can be employed in the system 100, which may be a chiller unit, such as for example a centrifugal chiller unit (A).

Referring to the heating unit 150, the heating unit 150 includes an evaporator 154 fluidly connected with a heating condenser 156, which is in fluid communication with a heating load 152. Optionally, an auxiliary heat source 140 may be employed as may be desired and/or suitable. A heat pump 158 may be employed to circulate fluid, e.g. water, through the heating unit 150.

In one embodiment, the cascade heat recovery system 100 connects the evaporator 154 from the heating unit 150 to the recovery condenser 120 of the cooling unit 110, where the recovery condenser 120 is different from the cooling condenser 116 of the cooling unit 110. The evaporator 154 is connected to the recovery condenser 120 such that the circuit of the heating unit 150 is isolated or decoupled from the heat rejection circuit 130 on which the cooling condenser 116 runs. The use of the recovery condenser 120 can use heat rejected by the evaporator 114 of the cooling unit 110 to be available to the heating unit 150 so as to provide lift to the heating unit 150 and improve its operating efficiency.

In some embodiments, the evaporator 154 of the heating unit 150 may be connected to the recovery condenser 120 through, e.g. a three way valve 126, and where in some examples a heat recovery pump 128 may be employed.

Figure 2:
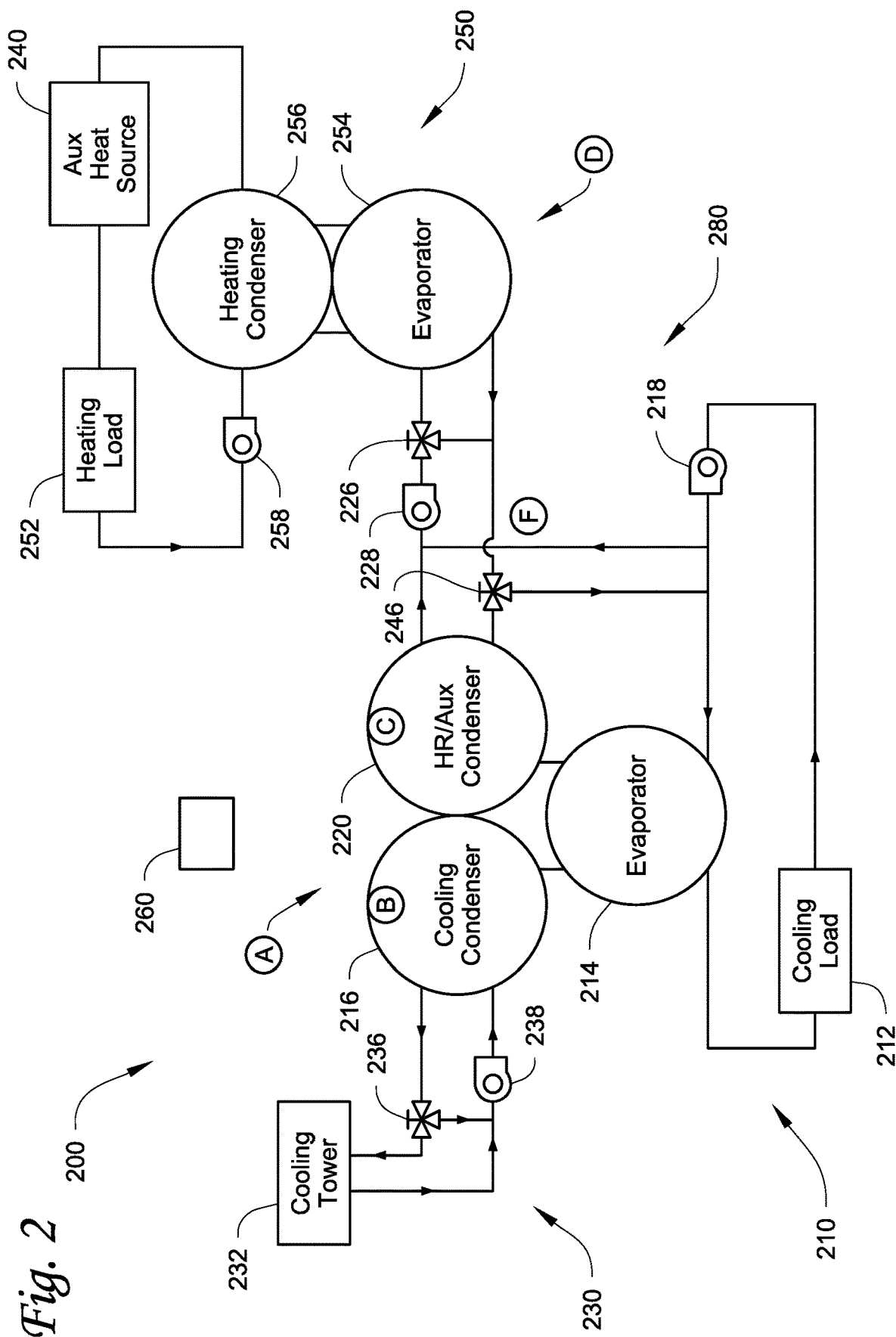
FIG. 2 is a diagrammatic plan view of one system that uses a cooling unit equipped with dual condensers, according to another embodiment.

FIG. 2 is a diagrammatic plan view of another cascade heat recovery system 200 that uses a cooling unit 210 equipped with dual condensers, one condenser 216 is sized for normal heat rejection (B) in the cooling cycle and the other condenser 220 is sized as a heat source (C) for a dedicated heat pump unit (D).

FIG. 2 adds a connection between the heating unit evaporator 254 and another cooling loop 280 (F) in fluid communication with the cooling unit evaporator, e.g. the water side. In this configuration, the cascade heat recovery system 200 can include a dedicated heat recover option. In the embodiment shown, the evaporator 254 of the heating unit 250 is connected to the cooling loop of the cooling unit, for example in fluid communication with the cooling unit 210 evaporator 214, such as for example upstream of the evaporator 214 water inlet and in some examples downstream from a water pump 218 of the cooling loop. Like reference numerals depict similar structures as illustrated in FIG. 1, but with the 200 reference numeral series and most are not further described.

In some embodiments, the evaporator 254 of the heating unit 250 may be connected to the cooling loop 280, such as through, e.g. a three way valve 246, so as to allow access to the cooling loop 280, under certain conditions.

For example, this connection can allow the heating unit 250 (D) to operate as a dedicated heat recovery chiller A when beneficial under the system conditions, such as for example when the cooling load is not so high or relatively low.

FIGS. 1 and 2 show three way valves, e.g. 126, 136, 226, 236, 246, by way of illustration. However, it will be appreciated that any one or more of the three way valves may be replaced for example by a variable drive if desired and/or suitable.

It will be appreciated that each of the systems 100, 200 may be controlled by a unit controller, e.g. 160, 260, that includes a processor, a memory, and an input/output (I/O) interface as may be needed and/or suitable to control operation of the valves and equipment, such as shown in FIGS. 1 and 2, as well as any drives to communicate with available sensors or transducers, such as may be used. In particular, depending upon the operating system conditions, either of the heat recovery approaches may be employed, such as for example through the recovery condenser of FIGS. 1 and/or 2, or through the access to the cooling loop 280 in FIG. 2. It will be appreciated that the controller is suitably configured to communicate, receive, and/or command the necessary components shown in FIGS. 1 and/or 2 to obtain the heat recovery approach desired.

The systems and methods described herein can solve several issues and improve system operation. First, the cooling unit(s) can be optimally sized and operated to meet the cooling load without regard to the heating load and/or heating unit(s) operation. This can simplify cooling unit selection, control, and system optimization. As another example, the cooling unit(s) can avoid being subjected to high condenser temperature operation, which will reduce cooling system inefficiency and/or improve cooling system efficiency, and which can reduce concern about surge in the cooling unit, e.g. in centrifugal compressor based cooling units. As yet another example, the control of the standard condenser water temperature from its heat sink, e.g. the cooling tower, may basically remain unchanged from the cooling unit's standard operating conditions. In yet another example, control of the standard condenser water temperature from its heat sink, e.g. cooling tower, could be optimized under some system operating conditions by slowing the cooling tower fans, reducing fan energy use, so as to raise the heat recovery source condenser temperature available to the heating unit to raise the heating unit's efficiency and/or capacity. (See e.g. FIGS. 1 and 2.)

Second, the heating unit(s) can be optimally sized and operated to meet a heating load without regard to the cooling load, for example as long as the cooling load exceeds the heating load. This can simplify heating unit selection, control, and system optimization. For example, this can be useful where many commercial buildings may operate the majority of hours in a cooling mode. As another example, this can be useful where a heating unit can limit its heating capacity to the lesser of the required heating load or heat recovery source condenser available heat. As yet another example, some high efficiency boilers can be used to provide the balance of the heating requirement/load, when for example the heating load exceeds the heat recovery source condenser available heat. (See e.g. FIGS. 1 and 2.)

Third, the efficiency, capacity, and reliability of the heat pump unit can be significantly increased as a result of the entering evaporator water temperature supplied from the cooling unit's heat recovery source condenser, e.g. at about 65 F to about 95 F, may be significantly higher than would be available to a dedicated heat recovery chiller from the system chilled water, e.g. at about 44 F to about 56 F. For example, the heating unit(s) efficiency and/or capacity improvement could be in the range of ten to forty percent. (See e.g. FIGS. 1 and 2.)

Fourth, the efficiency, capacity, and reliability of the cooling unit can be significantly increased as a result of the entering condenser water temperature supplied from the heat recovery unit's evaporator, e.g. at about 40 F to about 60 F, can be significantly lower than would be available to the standard condenser system cooling tower, e.g. at about 55 F to about 85 F. For example, the cooling unit(s) efficiency and capacity can improve as much as 20% as a result of the heating unit depressing the water temperature supplied from the heat recovery source condenser back to the cooling unit(s). (See e.g. FIGS. 1 and 2.)

Fifth, periodic cleaning can be avoided because the additional cooling unit heating source condenser waterside is a closed circuit isolated from the "dirty" condenser/cooling tower water circuit avoiding contamination. Additionally, the closed circuit can be designed such that the pump net positive suction head is suitable at various and/or all operating points. (See e.g. FIG. 1 and FIG. 2.)

Sixth, when the cooling unit functions to provide thermal storage cooling, the cooling unit can operate with normal condenser temperatures and the heat pump unit can elevate those temperatures as needed to effectively meet the heating unit requirements. (See e.g. FIG. 1 and FIG. 2.)

While the embodiments have been described in terms of various specific embodiments, those skilled in the art will recognize that the embodiments can be practiced with modification within the spirit and scope of the claims.

The invention claimed is:

1. A heating, ventilation, and air conditioning (HVAC) system, comprising:
   a cooling unit configured to deliver cooling to a cooling load, the cooling unit including:
      a cooling condenser in fluid communication with an evaporator, the evaporator in fluid communication with a recovery condenser, the cooling unit is configured to deliver cooling to a cooling load by way of a heat exchange relationship of the evaporator of the cooling unit with one or more of the cooling condenser and the recovery condenser, the recovery condenser configured as a heat source;
   a heating unit configured to deliver heating to a heating load, the heating unit including:
      an evaporator in fluid communication with a heating condenser, the heating unit configured to deliver heating to a heating load by way of a heat exchange relationship of the evaporator of the heating unit with the heating condenser;
   a heat recovery circuit configured to transfer a source heat from the cooling unit to the heating unit;
   a controller configured to control a heat recovery cycle of the HVAC system to use the heat recovery circuit, the controller selecting to provide heat from the cooling unit to the heating unit in the heat recovery cycle, the heat recovery circuit configured to transfer source heat from the cooling unit to the heating unit in the heat recovery cycle;
   a three way valve that is fluidly connected between the recovery condenser and the evaporator of the heating unit, and
   the HVAC system is configured to operate in one or more of a cooling mode, a heating mode, and the heat recovery cycle.

2. The HVAC system of claim 1, wherein the cooling unit further comprises a cooling loop.

3. The HVAC system of claim 2, wherein the evaporator of the heating unit is fluidly connected to the cooling loop of the cooling unit by way of a fluid connection upstream of the evaporator of the cooling unit.

4. The HVAC system of claim 3, wherein the heating unit receives the source heat from the cooling unit by way of the evaporator of the heating unit having fluid communication with the cooling unit.

5. The HVAC system of claim 3, wherein the cooling loop further comprises a water pump.

6. The HVAC system of claim 5, wherein the connection upstream of the evaporator of the cooling unit is also downstream from the water pump.

7. The HVAC system of claim 2,
wherein the three way valve is also fluidly connected between the cooling loop and the evaporator of the heating unit, the recovery condenser and the cooling unit each having a fluid connection with the evaporator of the heating unit and having a first junction upstream of the evaporator of the heating unit; and
wherein the HVAC system further comprises a second three way valve that is fluidly connected between the recovery condenser and the evaporator of the heating unit and that is fluidly connected between the cooling loop and the evaporator of the heating unit, the recovery condenser and the cooling unit each having a fluid connection with the evaporator of the heating unit and having a second junction downstream of the evaporator of the heating unit.

8. The HVAC system of claim 7, further comprising a pump disposed upstream of the first junction.

9. The HVAC system of claim 2, further comprising
a first variable drive of a first pump that is fluidly connected between the recovery condenser and the evaporator of the heating unit and that is fluidly connected between the cooling loop and the evaporator of the heating unit, the recovery condenser and the cooling unit each having a fluid connection with the evaporator of the heating unit and having a first junction upstream of the evaporator of the heating unit; and
a second variable drive of a second pump that is fluidly connected between the recovery condenser and the evaporator of the heating unit and that is fluidly connected between the cooling loop and the evaporator of the heating unit, the recovery condenser and the cooling unit each having a fluid connection with the evaporator of the heating unit and having a second junction downstream of the evaporator of the heating unit.

10. The HVAC system of claim 1, wherein the cooling unit is a water chiller.

11. The HVAC system of claim 1, wherein the cooling unit is a centrifugal water chiller.

* * * * *